United States Patent [19]

Suarez

[11] 4,260,012
[45] Apr. 7, 1981

[54] LOCOMOTIVE ENGINE COOLANT FILTER

[76] Inventor: Humberto Suarez, c/o Diesel Radiator Co., 1985 Janice Ave., Melrose Park, Ill. 60160

[21] Appl. No.: 111,655

[22] Filed: Jan. 14, 1980

[51] Int. Cl.³ .......................................... B01D 35/02
[52] U.S. Cl. ................................. 165/51; 105/62 A; 165/119; 210/435
[58] Field of Search ............ 105/26 R, 62 A; 165/51, 165/119; 210/232, 435, 451, 452, 453, 454, 497 R, 445; 123/41.48, 41.49; 180/54 A, 68 R

[56] References Cited

U.S. PATENT DOCUMENTS

| | | | |
|---|---|---|---|
| 1,931,988 | 10/1933 | Hromadka | 165/119 |
| 2,341,789 | 2/1944 | Justus | 105/62 A |
| 2,369,740 | 2/1945 | Johnson et al. | 210/435 |
| 2,722,316 | 11/1955 | Goscilo | 210/435 |

*Primary Examiner*—Ivars C. Cintins

*Attorney, Agent, or Firm*—Wegner, Stellman, McCord, Wiles & Wood

[57] ABSTRACT

A locomotive engine coolant filter arranged for facilitated maintenance notwithstanding obstructive confinement of the mounting space. The coolant filter is arranged to permit facilitated removal of the filter screen from the housing thereof for periodic maintenance as required. In one form, the filter housing is fixedly secured to the radiator inlet connector to extend coaxially thereof. In this form, the opposite end of the housing is provided with a removable closure permitting the withdrawal of the filter screen coaxially therefrom in the maintenance operation. In another form, the housing is removably sealingly clamped to the radiator inlet connector and to a flow passage duct for delivering coolant liquid from the engine. In this form, the filter screen is removable by a combined longitudinal and transverse displacement from the filtering position upon release of the clamps.

12 Claims, 6 Drawing Figures

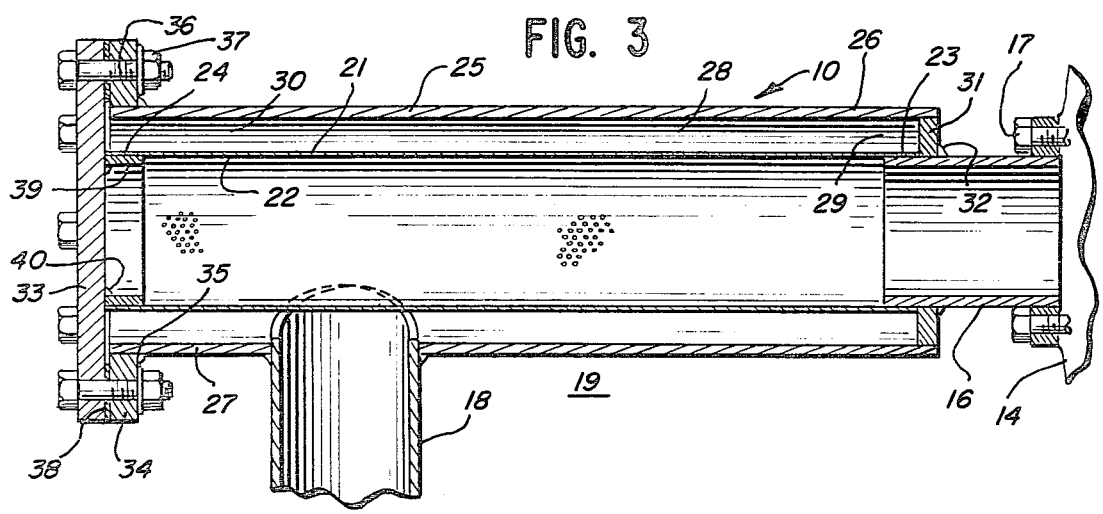
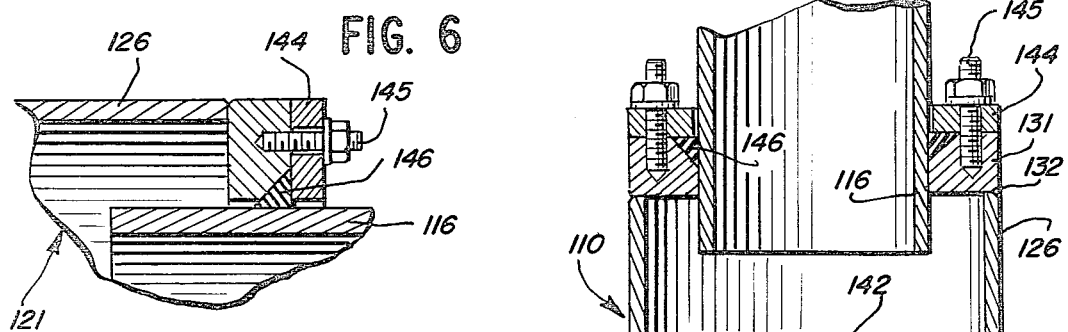
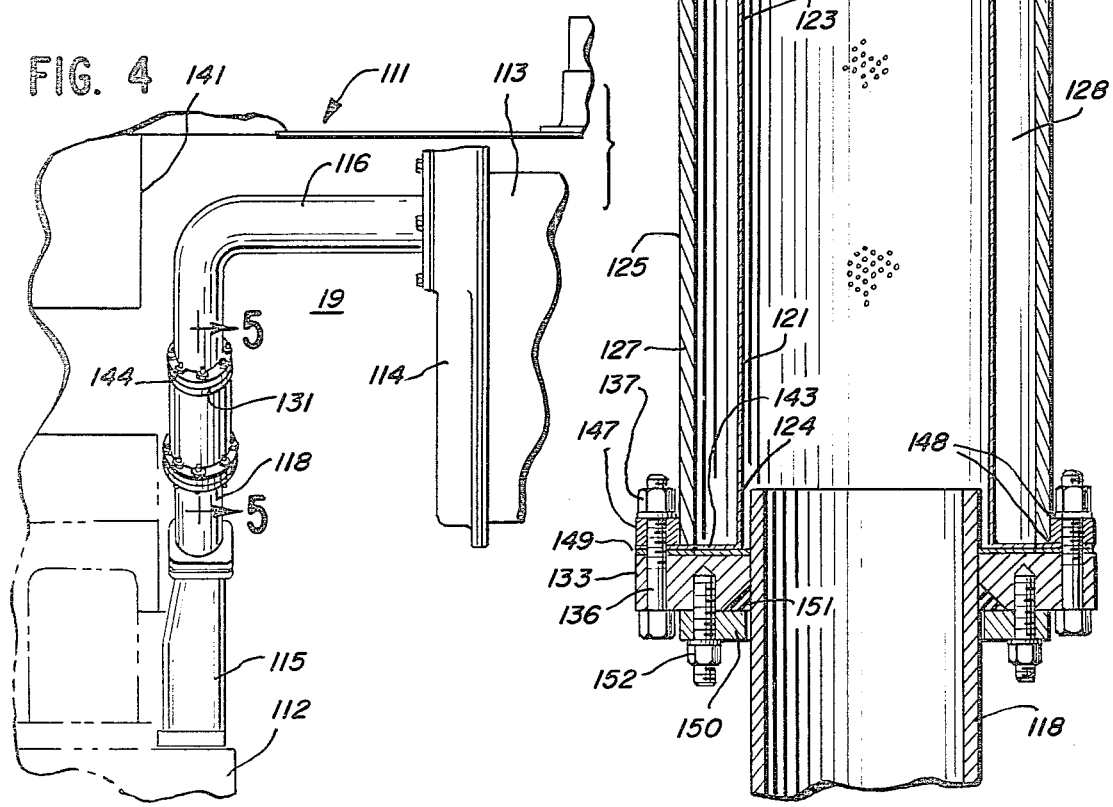

LOCOMOTIVE ENGINE COOLANT FILTER

BACKGROUND OF THE INVENTION

1. Field of the Invention

This invention relates to locomotive structures and in particular to means for filtering the engine coolant liquid.

2. Description of the Prior Art

In locomotive radiator assemblies, the radiator is provided with a core header defining the inlet for the coolant liquid. The header has been conventionally provided with an inlet filter screen extending across the core header and secured thereto by an outer radiator header having an inlet connector for connecting the flow passage means from the engine to the radiator. Because of substantial obstructive restriction on the access to the header, maintenance of the filter screen was quite difficult and expensive. In such prior art design, removal of the radiator header was required so as to provide access to the filter screen and obstructions adjacent the radiator and locomotive engine made such removal and servicing very difficult.

In an effort to resolve this vexatious problem, a modified form of filter screen was provided wherein the radiator header was provided with a small filter housing portion removably receiving a small inlet filter screen which, in turn, was secured therein by a suitable inlet connector member. While such structure permitted improved facility of maintenance because of the smaller size of the filter assembly, it had the serious disadvantage of reduced filtering capacity, thereby requiring more frequent servicing operations.

A further prior art radiator structure utilized a screen box in the conduit from the engine to the header adjacent the connection to the header. This structure also had the disadvantage of requiring the use of a relatively small filter screen and thereby increasing the frequency of maintenance requirements. Additionally, this prior art structure had a serious disadvantage in permitting collection of water in the lower part of the filter which could freeze when the locomotive engine was not in service during cold weather conditions and which, therefore, was found to have serious maintenance and structural problems.

SUMMARY OF THE INVENTION

The present invention comprehends an improved locomotive engine coolant filter assembly which eliminates the problems and disadvantages of the prior art structures discussed above in a novel and simple manner.

More specifically, the invention comprehends the provision in a locomotive having a radiator provided with a projecting tubular inlet connector in an engine adjacent the radiator below the level of the inlet connector, an improved coolant filter structure including a tubular filter screen having a first, inner end fitted coaxially in the inlet connector, and an opposite, outer end, a tubular housing having inner and outer ends, the housing extending coaxially of the filter screen and defining coaxially therebetween a tubular inlet chamber having inner and outer ends, a closure flange extending radially inwardly from the inner end of the housing and being sealingly secured to the radiator inlet connector to close the inner end of the inlet chamber and mount the housing to the radiator inlet connector, a closure member removably sealingly secured to the outer end of the housing to close the outer end of the inlet chamber and the outer end of the tubular filter screen, and flow passage means for conducting engine coolant liquid from the engine into the inlet chamber for flow through the filter screen to the radiator inlet connector.

In the illustrated embodiment, the tubular housing extends horizontally from the radiator inlet connector to above the engine and the flow passage means extends vertically upwardly from the engine to the housing of the filter.

The closure member may include an annular mounting element removably fitted in the outer end of the tubular filter screen for centering the outer end thereof in the filter housing.

The outer end of the housing may be provided with an annular collar to which the closure member is removably sealingly secured as by threaded fastening means.

The flow passage means may include a tubular connector opening chordally through the housing for improved swelling filtering action in the filter.

The flow passage means tubular connector may be arranged to open into the filtering chamber adjacent the outer end of the housing.

In another form, the coolant filter includes a tubular filter screen having a first, inner end defined by a transverse wall spaced coaxially outwardly of the inlet connector, and an opposite, outer end, a tubular housing having inner and outer ends, the housing extending coaxially of the filter screen and defining coaxially therebetween a tubular outlet chamber having inner and outer end, a first closure flange extending radially inwardly from the inner end of the housing and being sealingly secured to the radiator inlet connector to close the inner end of the outlet chamber and mount the housing to the radiator inlet connector, a second closure flange on the outer end of the housing, a closure member removably sealingly secured to the second closure flange to extend across the outer end of the housing to close the outlet end of the outlet chamber and the outer end of the tubular filter screen, flow passage means for conducting engine coolant liquid from the engine into the interior of the tubular filter screen for flow through the filter screen and outlet chamber into the radiator inlet connector, and means for removably sealingly securing the closure member to the flow passage means.

The flow passage means may extend coaxially into the outer end of the filter screen of the modified embodiment.

The flow passage means may extend into the outer end of the filter screen a distance less than the spacing of the inner transverse wall of the filter screen from the inlet connector of the radiator.

Clamp means may be provided for sealingly clamping the closure member to the flow passage means.

The locomotive engine coolant filter means of the present invention is extremely simple and economical of construction while yet providing for facilitated maintenance and servicing, as desired, and providing the highly desirable features discussed above.

BRIEF DESCRIPTION OF THE DRAWING

Other features and advantages of the invention will be apparent from the following description taken in connection with the accompanying drawing wherein:

FIG. 3 is a section taken substantially along the line 3—3 of FIG. 2;

FIG. 4 is a view similar to that of FIG. 1 but illustrating a modified form of filter means embodying the invention;

FIG. 5 is a fragmentary enlarged section taken substantially along the line 5—5 of FIG. 4; and FIG. 6 is a fragmentary enlarged section illustrating the means for connecting the housing to the radiator inlet connector.

DESCRIPTION OF THE PREFERRED EMBODIMENTS

Figure 1:
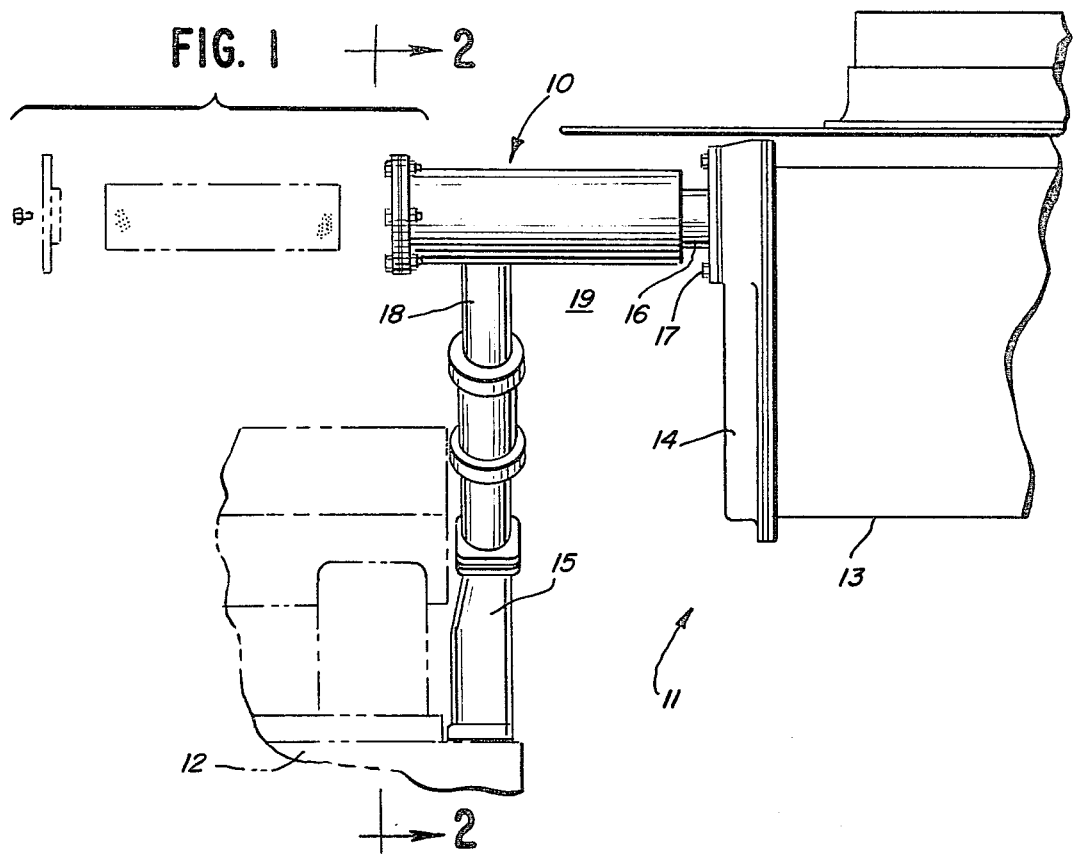
FIG. 1 is a fragmentary side elevation of a locomotive structure having a coolant filter means embodying the invention, with the filter screen being illustrated in broken lines in a removed disposition.

In the exemplary embodiments of the invention as disclosed in the drawing, a filter assembly generally designated 10 is shown for use in a locomotive structure generally designated 11 including an engine 12 and a radiator 13 provided with a header 14. The engine is provided with a flow passage duct means 15 for delivering coolant liquid from the engine to be suitably cooled in the radiator.

As shown in FIG. 1, the radiator header 14 may be provided with a tubular inlet connector 16 secured to the header by bolts 17. The flow passage duct 15 may include a tubular connector 18.

As discussed above, the space adjacent the connectors 16 and 18 in the conventional locomotive is severely restricted by obstructions so that access thereto is severely limited. The present invention comprehends the provision of a filter assembly 10 which, notwithstanding the limited access permitted to the space generally designated 19 above the engine 12 and outwardly of the radiator header 14, permits facilitated servicing of the filter assembly when desired.

Figure 2:
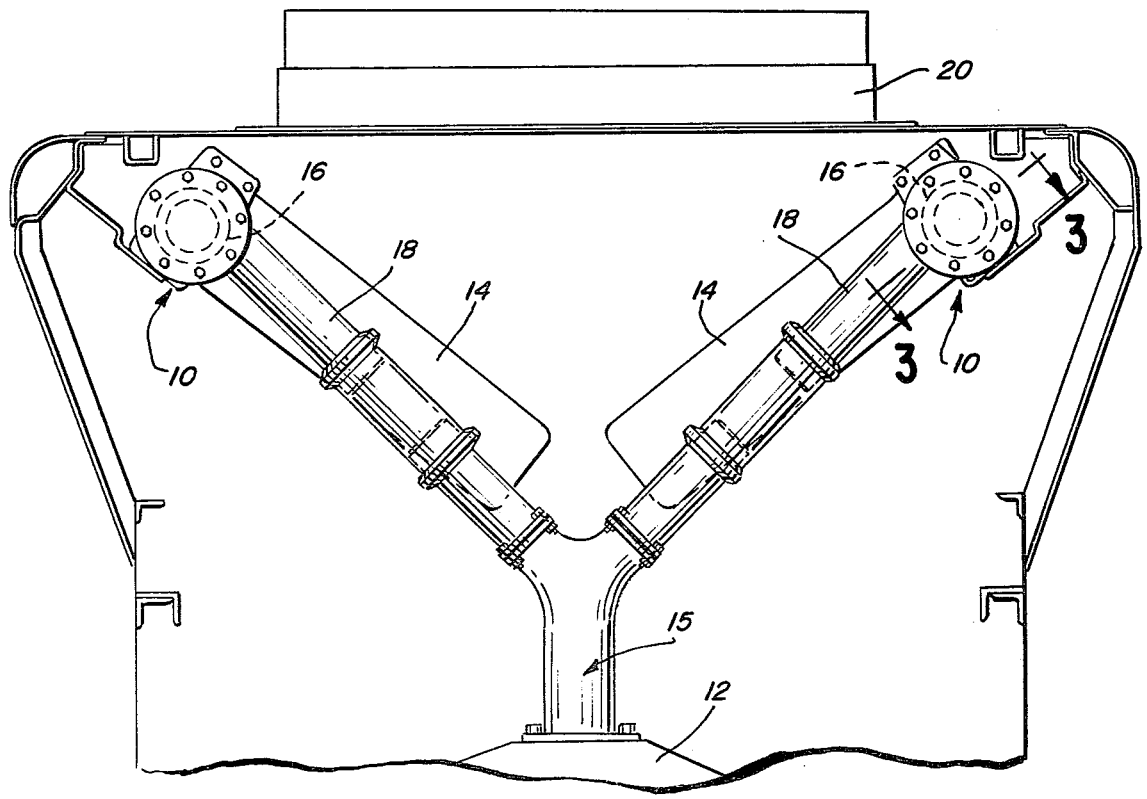
FIG. 2 is a vertical section taken substantially along the line 2—2 of FIG. 1.

More specifically, as illustrated in FIG. 2, the flow passage duct means 15 may define a "Y" connection having a pair of tubular connectors 18 permitting the use of a pair of filter assemblies 10 in association with a corresponding pair of tubular inlets 16 to the radiator. As each of the filter assemblies 10 is similar, the following description will be limited to the construction of one such assembly, it being obvious to those skilled in the art that the description pertains equally to the other. As further shown in FIG. 2, the radiator may be cooled as by a conventional enclosed fan 20.

Referring now more specifically to FIG. 3, filter assembly 10 includes a tubular filter screen 21 conventionally formed of metal and defining a plurality of filter apertures 22. The filter screen further defines a first, inner end 23 and a second, outer end 24. As shown in FIG. 3, inner end 23 is removably fitted on the inlet connector 16 to project coaxially outwardly therefrom.

The filter assembly further includes an outer tubular housing 25 having an inner end 26 and an outer end 27. As shown in FIG. 3, housing 25 has a diameter larger than the diameter of tubular filter screen 21 and extends coaxially thereof to define therebetween a tubular inlet chamber 28 having an inner end 29 and an outer end 30.

The inner end 26 of housing 25 may be sealingly secured to the radiator inlet connector 16 by a collar 31 defining a flange on the inner end 26 of the housing which may be secured to the radiator inlet connector 16 as by a suitable weld 32. As will be obvious to those skilled in the art, suitable removable securing means for securing flange 31 to the inlet connector 16 may be utilized within the scope of the invention.

Thus, as seen in FIG. 3, flange collar 31 effectively closes the inner end 29 of the inlet filter chamber 28. At the same time, flange collar 31 effectively mounts the housing 25 to inlet connector 16 to project coaxially outwardly therefrom.

A closure member 33 is removably sealingly secured to the outer end 27 of housing 25 to close the outer end 30 of inlet chamber 28 and the outer end 24 of filter screen 21. More specifically, as shown in FIG. 3, outer end 27 of housing 25 is provided with a radially outer collar 34 defined by an annular flange secured to housing end 27 as by weld means 35. Closure member 33 comprises a circular plate removably secured to collar 34 by a plurality of threaded securing elements, such as bolts 36 and cooperating nuts 37. A suitable annular gasket 38 may be provided between closure member 33 and collar 34 for sealingly closing the outer ends of the inlet chamber 28 and filter screen 21 when the closure member 33 is installed on the collar.

As further illustrated in FIG. 3, closure member 33 may be provided with an inwardly projecting annular support 39 fitted into outer end 24 of filter screen 21 to coaxially support the outer end of the filter screen within the outer end of housing 25. Support 39 may be secured to the closure member 33 as by a suitable weld 40.

Tubular connector 18, as illustrated in FIGS. 2 and 3, opens through the sidewall of housing 25 into the inlet chamber 28 chordally, thereby directing the incoming coolant liquid in a swirling manner around the filter screen for effecting a self-flushing action during operation of the locomotive engine. As shown in FIG. 3, inlet 18 is preferably located adjacent to outer end of the housing 25 so as to provide a substantial length of the filter chamber 28 inwardly thereof, thereby providing improved filtering action and reducing the required frequency of maintenance of the filter.

A highly desirable feature of filter assembly 10 is the arrangement of filter screen 21 to have a large filtering area, while yet permitting facilitated removal and installation in the highly restricted and obstructed space 19. Thus, the required frequency of maintenance is substantially reduced while yet assuring proper filtering of the coolant liquid for improved long life of the locomotive engine.

Because of the substantial length of the filter screen inwardly of the tubular connector 18, a substantial amount of filtered material may be collected in the filter chamber 28, such as at inner end 29 thereof, while yet continued effective filtering of the coolant liquid may be effected.

Referring now to the embodiment of FIGS. 4-6, a modified form of filter assembly generally designated 110 is shown to comprise a filter assembly generally similar to filter assembly 10 but mounted end-to-end in series with a turned inlet connector 116 on the header 114 of the radiator 113, and the tubular connector 118 of the flow passage duct means 115 leading from the engine 112. Thus, the filter assembly 110 is adapted for use in a locomotive structure generally designated 111 wherein an obstruction 141 may be present at the outer end of space 19 preventing the removal of the filter screen horizontally outwardly from the filter assembly, as illustrated in broken lines in FIG. 1.

Construction of filter assembly 110 may be best seen with reference to FIG. 5 wherein the filter assembly is shown to include a tubular filter screen 121 having a transverse wall 142 at the inner end 123 thereof. The outer end 124 of the filter screen defines an outturned flange 143. As shown in FIG. 5, in the assembled arrangement of filter assembly 10, the inner end of the tubular connector 118 projects coaxially into the outer end 124 of the filter screen.

Filter assembly 110 further includes an outer housing 125 having an inner end 126 secured to a flange collar 131 as by weld 132. The collar is adapted to be fitted on the tubular inlet connector 116 and is sealingly clamped thereto by a clamp ring 144 adjustably secured to the collar 131 by lock screws 145. A sealing O-ring 146 is compressed between the clamp ring 144 and collar 131 so as to sealingly engage inlet connector 116 and secure the housing to the inlet connector to extend coaxially outwardly therefrom.

A flange collar 147 is secured as by welds 148 to the outer end 127 of housing 125 to project radially outwardly therefrom. An annular closure member 133 is secured to the flange collar 147 by suitable threaded means, such as bolts 136 and nuts 137. As shown in FIG. 5, flange 143 of filter screen 121 is received between flange collar 147 and closure member 133 and may be suitably sealed therebetween by gaskets 149 on opposite sides of the flange.

Closure member 133 is sealingly mounted to the connector 118 by means of a clamp ring 150 and an O-ring 151, the ring 150 being clamped to the closure member 133 by a suitable lock screw 152. O-ring 151 functions similarly to O-ring 146 in being compressed into sealing mounting engagement with the inner tubular member as a result of the clamping thereof between the two confronting annular members 144-131 and 150-133.

Thus, as shown in FIG. 5, coolant liquid from the engine 112 may be delivered to the interior of filter screen 121 through the inlet conduit 118. The coolant liquid is then filtered in passing through the screen with the filtered liquid then being passed through the annular outlet chamber 128 into the inlet connector 116 on header 114. The diameter of filter screen 121 may be at least as great as the diameter of the tubular connectors 116 and 118 so as to provide a substantial area of filtration for improved filtering and low maintenance requirements.

When it is desired to service the filter, the clamped mounting of the housing 126 to the connectors 116 and 118 may be loosened and the closure member 133 removed from extension across the outer end 127 of the housing. The filter screen may be removed by longitudinal movement toward the inlet connector 116 to permit the flanged end 143 to clear the tubular element 118. Thus, as shown in FIG. 5, the spacing of filter screen transverse end wall 142 from the outer end of tubular connector 116 is preferably slightly greater than the length of tubular connector 118 inwardly of the closure member 133 to permit such transverse removal of the filter screen.

Thus, the filter assembly 110 functions generally similarly to the filter assembly 10 and is advantageously adapted for use in a locomotive engine environment wherein an obstruction, such as obstruction 141, precludes the utilization of the filter assembly 10, as discussed above. Elements of filter assembly 110 corresponding to elements of filter assembly 10 are identified by similar reference numerals but 100 higher. Except as discussed above, the filter assemblies function in similar manners.

The foregoing disclosure of specific embodiments is illustrative of the broad inventive concepts comprehended by the invention.

I claim:

1. In a locomotive having a radiator provided with a projecting tubular inlet connector, and an engine adjacent the radiator below the level of said inlet connector, the improvement comprising:
   a tubular filter screen having a first, inner end fitted coaxially on said inlet connector, and an opposite, outer end;
   a tubular housing having inner and outer ends, said housing extending coaxially of said filter screen and defining coaxially therebetween a tubular inlet chamber having inner and outer ends;
   a closure flange extending radially inwardly from said inner end of the housing and being sealingly secured to said radiator inlet connector to close said inner end of said inlet chamber and mount said housing to said radiator inlet connector;
   a closure member removably sealingly secured to said outer end of the housing to close said outer end of said inlet chamber and the outer end of said tubular filter screen; and
   flow passage means for conducting engine coolant liquid from said engine into said inlet chamber for flow through said filter screen to said radiator inlet connector.

2. The locomotive structure of claim 1 wherein said tubular housing extends horizontally from said radiator inlet connector to above said engine.

3. The locomotive structure of claim 1 wherein said tubular housing extends horizontally from said radiator inlet connector to above said engine and said flow passage means extends vertically from said engine to said housing.

4. The locomotive structure of claim 1 wherein said closure member includes an annular mounting element removably fitted in said outer end of the tubular filter screen for centering said outer end of the filter screen in the housing.

5. The locomotive structure of claim 1 wherein a collar projects radially outwardly from said outer end of the housing and said closure member is removably sealingly secured thereto by threaded fastening means.

6. The locomotive structure of claim 1 wherein removable support means are provided for removably supporting said outer end of the filter screen coaxially within said housing.

7. The locomotive structure of claim 1 wherein said flow passage means includes a tubular connector opening chordally through said housing to said tubular inlet chamber.

8. The locomotive structure of claim 1 wherein said flow passage means includes a tubular connector opening chordally through said housing to said tubular inlet chamber adjacent said outer end of the housing.

9. In a locomotive having a radiator provided with a projecting tubular inlet connector, and an engine adjacent the radiator below the level of said inlet connector, the improvement comprising:
   a tubular filter screen having a first, inner end defined by a transverse wall spaced coaxially outwardly of said inlet connector, and an opposite, outer end;
   a tubular housing having inner and outer ends, said housing extending coaxially of said filter screen and defining coaxially therebetween a tubular outlet chamber having an inner and outer end;

a first closure flange extending radially inwardly from said inner end of the housing and being sealingly secured to said radiator inlet connector to close said inner end of said outlet chamber and mount said housing to said radiator inlet connector;

a second closure flange on said outer end of the housing;

a closure member removably sealingly secured to said second closure flange to extend across the outer end of the housing to close said outer end of said outlet chamber and the outer end of said tubular filter screen;

flow passage means for conducting engine coolant liquid from said engine into the interior of said tubular filter screen for flow through said filter screen and outlet chamber into said radiator inlet connector; and means for removably sealingly securing said closure member to said flow passsage means.

10. The locomotive structure of claim 9 wherein said flow passage means extends coaxially into said outer end of the filter screen.

11. The locomotive structure of claim 9 wherein said flow passage means extends coaxially into said outer end of the filter screen a distance less than the spacing of said transverse wall of the filter screen from said inlet connector.

12. The locomotive structure of claim 9 wherein clamp means are provided for sealingly clamping said closure member to said flow passage means.

* * * * *